No. 822,088. PATENTED MAY 29, 1906.
S. J. TURNER.
WHEEL.
APPLICATION FILED SEPT. 1, 1905.
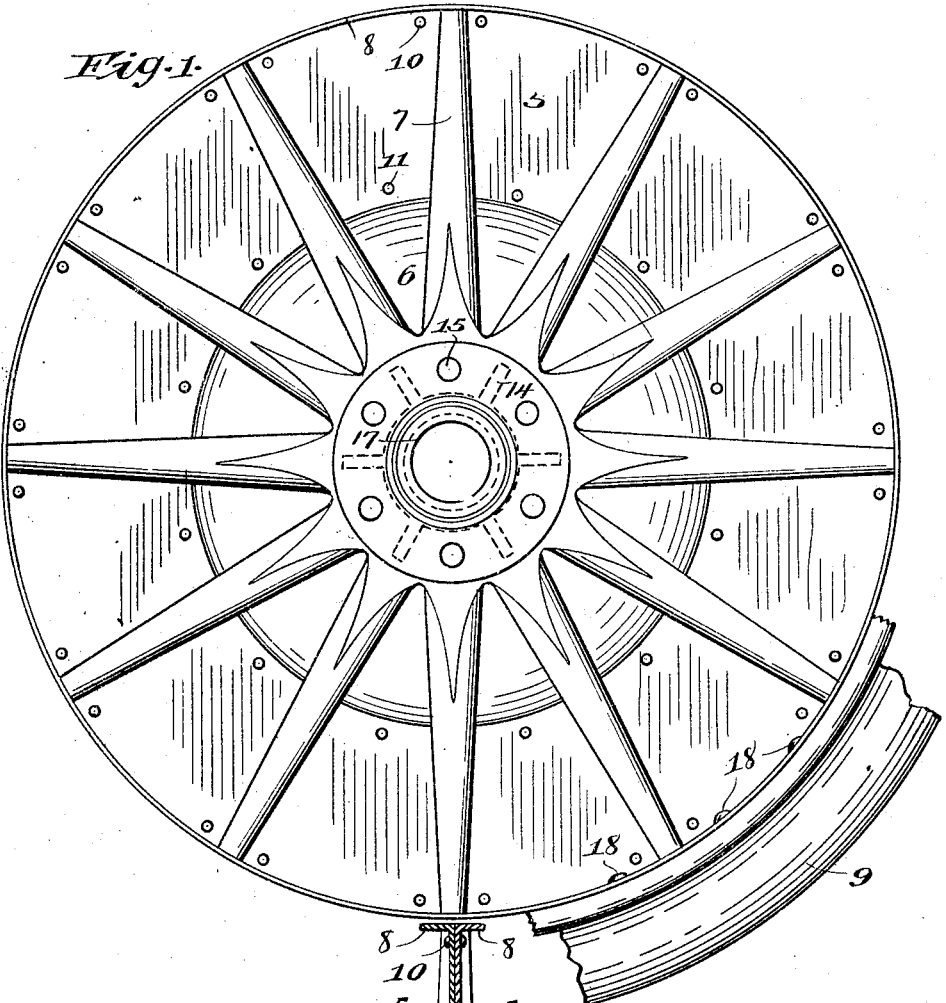
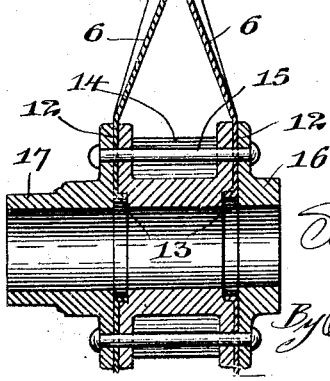

UNITED STATES PATENT OFFICE.

SAMUEL J. TURNER, OF CHICAGO, ILLINOIS, ASSIGNOR OF ONE-HALF TO HARRY J. FISH, OF CHICAGO, ILLINOIS.

WHEEL.

No. 822,088.             Specification of Letters Patent.            Patented May 29, 1906.

Application filed September 1, 1905. Serial No. 276,714.

*To all whom it may concern:*

Be it known that I, SAMUEL J. TURNER, a citizen of the United States, residing at Chicago, in the county of Cook and State of Illinois, have invented certain new and useful Improvements in Wheels, of which the following is a specification.

My invention relates to the construction of wheels, and has reference more particularly to metal wheels such as are employed on automobiles, cars, and other heavy vehicles.

The main object of the invention is to provide a simple and strong wheel structure that may be economically and easily constructed and assembled and that shall combine a maximum of strength and rigidity with a minimum of metal and weight.

To this end my invention resides in a wheel characterized principally by the provision of a pair of symmetrical solid disk-shaped members securely riveted together with their inner faces in contact throughout the outer portion of the body or web of the wheel, each of said disk-shaped members having a series of integral radial ribs extending from the hub to the outer periphery or rim, substantially as hereinafter described, and more particularly pointed out in the claims.

Referring to the accompanying drawings, which show an approved mechanical embodiment of my invention, Figure 1 is a side elevational view of the wheel-body and hub with a fragment of the rim mounted thereon, and Fig. 2 is a central cross-section through the hub and upper portion of the body.

Referring to the drawings, it will be seen that the wheel structure is principally made up of a pair of thin metal disks, each of which has an annular outer portion 5, lying in a plane at right angles to the axis of the hub, and an inner or central portion 6, that is outwardly flared from its junction with the flat portion 5 to its connection with the hub. Disposed radially of each disk are a series of spoke-like members or ribs 7, that may conveniently be formed by pressing them outwardly from the metal of the disk, it being observed that said ribs extend from the hub to the outer periphery of the disks, which latter portion of each disk is outwardly bent at right angles to form a flange 8, the two flanges together constituting a seat for the usual channel-rim, (indicated at 9 in Fig. 1.) It will also be observed that the ribs 7 partake of the dished character of the disks in which they are formed, each rib being bent to form an angle substantially opposite the junction of the flat and inclined portions 5 and 6 of the disk. These ribs or spokes 7 constitute radial reinforcements of the disks, adapting the latter to resist compressional strains exerted upon the wheel by the load, as well as effectively resisting any tendency on the part of the wheel to warp or buckle. The disks thus formed are united face to face by outer and inner rivets 10 and 11, respectively, the outer annular portions being in face contact, as shown in Fig. 2, the flanges 8 together forming an annular seat for the rim 9, and the flaring portions 6 being suitably secured at their inner margins to the hub. For this latter purpose I preferably bend the inner marginal portions of the flaring members 6 into planes parallel with each other and at right angles to the axis of the hub, as shown at 12 in Fig. 2, turning inwardly the extreme margins to form short lips or flanges 13, lying parallel with the axis of the hub, and between the parts thus formed I interpose an inner hub-member 14, said parts being rigidly united by a series of bolts 15. Where a hub of somewhat greater length than the width of the central portion of the wheel is desired, this may be readily obtained, as shown in Fig. 2, by bolting to the outer portions 12 of the disks the inner and outer hub extensions 16 and 17, respectively, which latter parts may conveniently be attached by the bolts 15, above referred to.

The described formation of the two symmetrical disks making up the main body portion of the wheel may be secured in any known manner or by any known means of forming and shaping metal; but they are most easily and cheaply made by pressing from thin metal plates or disks by means of suitably-formed dies, it being entirely feasible to form the dished portions, the ribs or spokes, and the flanges by a single pressing or stamping operation. The parts once formed are readily and quickly assembled by simply bringing them together into their proper relative positions and permanently and rigidly uniting them by the transverse rivets and bolts. The rim 9 may then be slipped over the periphery and united thereto by any suitable means, such as rivets 18.

A wheel constructed as above described is of comparatively light weight, being to a large extent hollow, and at the same time it possesses a high degree of strength and rigidity and resistance to deforming strains. The disks may be assembled with the hollow ribs or spokes registering with each other, or angularly offset, as desired, but preferably the former. By limiting the dished portion of the wheel to practically the inner half of its radial extent the wheel presents a neat and sightly appearance, and with the integral ribs or spokes extending clear to the rim and the outer flat marginal portions rigidly bolted together possesses an even greater resistance capacity to buckling strains than wheels which are made dish-shaped throughout their entire extent from hub to rim.

I do not limit the invention to the precise and exact details described and shown, since it is evident that these might be varied by those skilled in the art to some extent to suit individual tastes without departing from the invention or sacrificing any of the advantages thereof.

I claim—

1. A wheel-body comprising a pair of solid metal disks having outer annular portions parallel to each other and rigidly united and central oppositely-dished portions adapted to receive the hub, said disks also having integral laterally-offset spokes formed therein extending from hub to rim, substantially as described.

2. A wheel-body comprising a pair of solid metal disks having outer annular portions parallel to each other and rigidly united in surface contact with each other, and central oppositely-dished portions adapted to receive the hub, said disks also having integral spokes outwardly pressed therefrom and extending from hub to rim, substantially as described.

3. A wheel-body comprising a pair of solid thin metal disks having outer annular portions parallel to each other and rigidly united in surface contact with each other, oppositely-extending peripheral flanges unitedly constituting a seat for the rim, and central oppositely-dished portions adapted to receive the hub, said disks also having integral spokes outwardly pressed from the metal of said annular and dished portions, substantially as described.

4. A metal wheel comprising a pair of solid thin metal disks each formed with a flat outer annular portion, a peripheral flange, a central dished portion, and a series of outwardly-pressed radial reinforcing-ribs extending across the full width of both the annular and dished portions, said disks being rigidly united with their annular portions in contact with each other, a rim mounted upon said peripheral flanges, and a hub secured to the inner margins of the dished portions, substantially as described.

SAMUEL J. TURNER.

Witnesses:
SAMUEL N. POND,
FREDERICK C. GOODWIN.